United States Patent Office.

W. H. H. PETERS, OF TUSKEGEE, ALABAMA.

Letters Patent No. 90,779, dated June 1, 1869.

IMPROVED MEDICAL COMPOUND.

The Schedule referred to in these Letters Patent and making part of the same.

To all whom it may concern:

Be it known that I, W. H. H. PETERS, of Tuskegee, in the county of Macon, and State of Alabama, have invented a new and improved Medical Compound; and I do hereby declare that the following is a full, clear, and exact description thereof, which will enable others skilled in the art to make and use the same.

This invention provides an efficient remedy for treating rheumatism, neuralgia, gout, and all diseases of nervous origin.

It consists of the following ingredients and proportions of the same:

Powdered gum-guaiacum, one ounce.
Cream of tartar, one ounce.
Saltpetre, one ounce.
Powdered sulphur, one ounce.
Powdered ginger, one ounce.
Black pepper, (bruised,) one ounce.

These ingredients are to be well mixed and macerated for about fourteen days in one quart of proof-spirits, or (preferably) good whiskey.

It is then filtered through paper, when it is ready for use.

I desire to be understood as not limiting my invention to the precise proportions herein set forth, as the same may be reasonably varied without affecting the quality of the compound.

Having thus described my invention,

I claim as new, and desire to secure by Letters Patent—

A medical compound, composed of the ingredients herein set forth.

W. H. H. PETERS.

Witnesses:
 WM. C. McIVER,
 A. S. HARPER.